Feb. 25, 1969  E. RICKETT  3,428,993
ELECTRICALLY HEATED WINDSHIELD WIPER ASSEMBLY
Filed Dec. 27, 1966

INVENTOR.
EDWARD RICKETT
BY
ATTORNEY

United States Patent Office 3,428,993
Patented Feb. 25, 1969

3,428,993
ELECTRICALLY HEATED WINDSHIELD
WIPER ASSEMBLY
Edward Rickett, Littleton, Colo., assignor to The Defroster Company, Inc., Littleton, Colo., a corporation of Colorado
Filed Dec. 27, 1966, Ser. No. 604,926
U.S. Cl. 15—250.06     10 Claims
Int. Cl. B60s 1/32; A47l 1/02

ABSTRACT OF THE DISCLOSURE

A windshield wiper has small diameter electric heating wires embedded in the rubber blade providing a heated blade for reducing of accumulated ice, etc. The plurality of small diameter wires are encased in heat-resistant flexible coatings, maintaining the natural flexibility of the rubber blade. The heating elements, connections to lead wires, the lead wires, etc. are all encased so as to form a weather-resistant and moisture-proof housing.

---

A number of windshield wipers which have associated with them electrically heating elements have been proposed in the prior art. While numerous such devices have been proposed, none have found a commercial outlet due, without a doubt, to the inherent defects in the units. For example, one proposed unit provides a bare, helical wire heating element which is encased in the rubber blade without any protection for the rubber from the heating element. Another proposes to heat a metal backing element with the intent to reflect heat from the metal element onto the windshield. Other devices suggest the addition of a metal-encased heating element alongside the blade for heating the windshield to melt accumulated ice and snow, etc. One of the major difficulties with all the prior art devices is the fact that they are essentially inflexible and, further, the added paraphernalia substantialy reduces any flexibility which the blade may have.

According to the present invention, I provide a windshield wiper blade which has electrically heated elements embedded therein and which blade retains its essential natural flexibility, but provides the quantity of heat necessary to melt frozen precipitation on the blade and windshield. The flexibility is achieved by the use of a plurality of small diameter heating elements which themselves are very flexible, and, by encasing the elements in a very flexible heat-resistant covering, the rubber of the blade is protected from the heating elements. A plurality of small diameter wire heating elements are used to provide the necessary temperatures for melting frozen precipitation within the limits of current available. The invention provides heating elements in spaced-apart passages in a windshield wiper blade for a better and faster distribution of the heat from the heating elements, providing heat in the windshield wiper blade itself, as well as on the windshield, for the removal of ice, snow, etc. In one aspect of the invention the heating wires may be embedded in an existing windshield wiper to provide the advantages of the invention and in another aspect of the invention, the wires extend through passages in the rubber prepared specifically for such purpose.

It is, therefore, an object of the invention to provide an electrically heated windshield wiper to prevent frozen precipitation from accumulating on the wiper blade or windshield of a vehicle.

Another object of the invention is to provide an electrically insulated and heat transfer means for housing heater elements in a resilient wiper blade which provides the temperatures necessary for preventing accumulation of frozen precipitation and which retains the natural resiliency of the wiper blade.

A still further object of the invention is to provide means for encasing heater elements in a highly resilient and flexible rubber windshield wiper blade that resists the temperatures produced in the heater elements during the time of heating thereof, and provides good transfer of heat from the elements through the protective coating and into the covered blade itself.

These and other objects and advantages of the invention may be readily ascertained by referring to the following description and appended illustrations in which.

Figure 1:
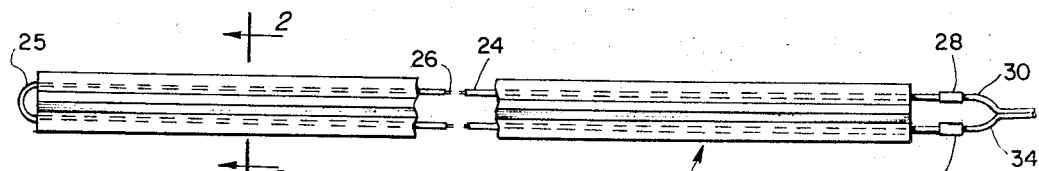
FIG. 1 is a top plan view of a windshield wiper containing heat elements according to the invention.
Figure 2:
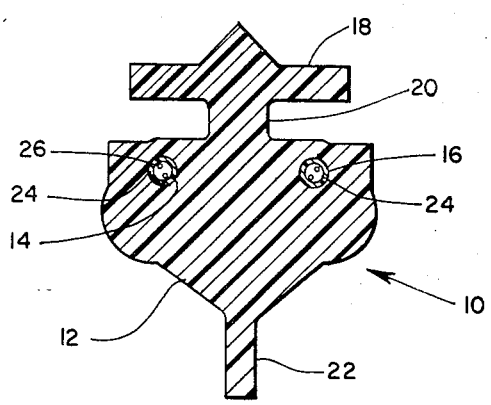
FIG. 2 is an enlarged detailed cross-sectional view of the windshield wiper blade of FIG. 1, taken along section lines 2—2.

In the wiper blade shown in FIGS. 1 and 2, the rubber blade element is shown in general by numeral 10, and has a substantially uniform cross-sectional configuration throughout its length. The blade includes a body portion 12 through which are formed small passages 14 and 16 on opposite sides of a center line passing through the blade. The passages 14 and 16 extend through the length of the blade and are spaced apart in the rubber to provide for the distribution of the heat from elements which are passed through the passages throughout the blade itself. A top flange 18 is mounted on a web 20, leaving elongated grooves along the top of the blade for attachment of a metal attaching fixture, such as is standard in windshield wiper construction. A bottom web 22 extends along the length of the body 12 and is the element of the blade that contacts the windshield. A Teflon, or other heat-resistant material, flexible tube 24 is passed through one of the passages 14 and 16 is reversed bent at end 25 and passed back through the other passage. A pair of Nichrome wires 26 extend through the tube 24, providing a loop of the heater element. The pair of Nichrome wires are illustrative, since the number depends on several factors. One end of the wire 26 is attached by a connector 28 to a covered lead wire 30, and the opposite end of the Nichrome heater element wires is attached by a connector 32 to another covered lead wire 34, the covering of the wires is joined together for purposes of passing through the cowling to a source of electrical energy.

In one form of the invention a 20 to 24 gauge Teflon, or other polyfluoro-alkene or equivalent, tube is used for the resisting of the heat of the Nichrome wires to protect the rubber blade, and a pair of 30 gauge Nichrome wires provide the heating elements. The size of the heating element wire may be changed to provide sufficient temperature corresponding to the length of the resistance wire in the blade, the available current, etc. In a preferred form, Teflon, which is a product of the Du Pont Company, is used as a sheathing for the heater elements. However, any other polyfluoro-ethylene may be used for the tubing, and, also, other polyfluoro-alkenes may be used in place of the Teflon. The small size of the tubing permits rapid heat dissipation from the Nichrome wires and prevents the burning up of the tube and the rubber in the blade. The blade is preferably made of natural rubber which was high resiliency and flexibility. Currently used curved windshields require a high degree of flexibility and fairly elaborate framework is required to support the blade to permit it to flex as it wipes the surface. The wire of the heating element should be able to carry from 1 to 5 amps so as to produce a maximum of 850° F. in the wire. The use of multiple small wires in the heat resistant tubing maintains the essential flexibility of the rubber blade, since the smaller wires are more flexible than the larger wires. Thus, to maintain flexibility a plurality of wires should be used which will give the same resistance as a larger wire to produce the necessary heat. The polytetrafluoro-alkene tubing is moisture resistant, and when embedded in the wiper blade, as shown in FIG. 1, moisture cannot penetrate into the heater element. The connectors may be covered with a plastic sleeve which is heat-shrunk around the connector to provide a waterproof protection, and, of course, the lead wires are plastic, rubber or otherwise coated to produce a moisture-resistant circuit. The importance of this is readily understood when it is considered that the windshield wiper is, at least under driving conditions, completely exposed to all weather elements. Accumulatin of moisture in and around the resistance wire, the connections and the leads would disrupt the circuit. The size of leads and resistance wires, of course, are determined by the current of the particular vehicle, and this may be a standard 6, 12 or other voltage of the particular vehicle.

In place of polytetrafluoro-alkene, a fiberglass tubing may be used, where the fiberglass is impregnated with a resin to make it a waterproof coating for the Nichrome resistance wire. The fiberglass provides good resistance to the heat, but currently available fiberglass tubing has generally poor resistance to the weather elements under conditions of use of the windshield wiper blade.

Figure 3:
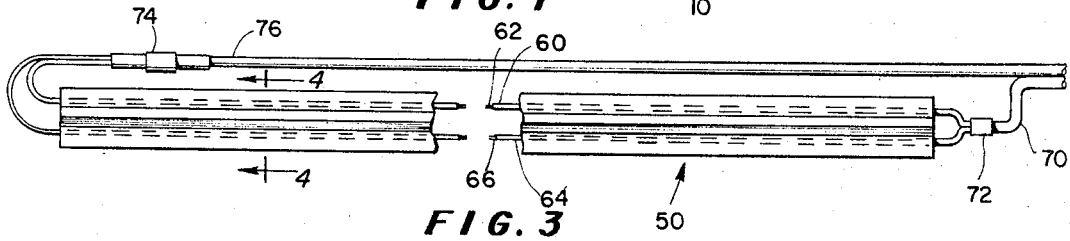
FIG. 3 is a top plan view of a modified form of the invention, illustrating the attachment of heater element wires to an available windshield wiper blade.
Figure 4:
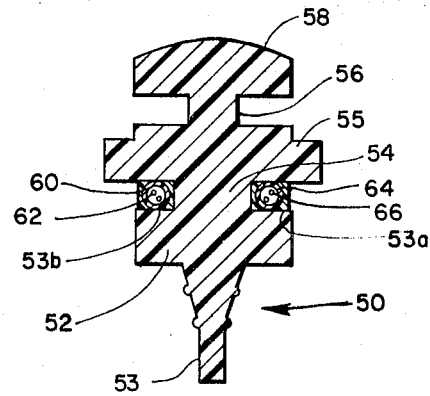
FIG. 4 is a cross-sectional view of the blade of FIG. 3, taken along section lines 4—4.

In another embodiment, shown in FIGS. 3 through 4, a commercially available wiper blade, for instance as shown in United States Patent No. 2,782,444, may be converted by the addition of resistance wire in a heat resistant tubing embedded between vertical flanges of such a wiper blade. The blade, shown in general as 50 in FIGS. 3 and 4, includes a body 52 having an extending windshield wiping web 53 substantially normal thereto and an opposed web 54 extending therefrom. A lateral flange 55 on web 54 produces a bight on both sides between the body 52 and the flange 55. Another web 56 and a top lateral flange 58 completes the structure, leaving a pair of opposed upper bights on the wiper blade. The upper bights are arranged to accommodate a metallic bracket for attachment to a windshield wiper assembly, as is conventional in the art. The bights 53a and 53b between the body 52 and the lateral flange 55 are arranged to accommodate heat resistant tubing containing a pair of Nichrome resistance wires. Tubing 60 is mounted in the bight 53b and it contains wires 62. Tubing 64 is mounted in bight 53a and it contains Nichrome wires 66 therein. The tubes are pressed in the bight on each side and a sealant seals the tubes in position in the bight. Preferably, silicone rubber is used as the sealant and various types of commercially available silicone rubber may be used. The silicone rubber of choice is one which adheres to the rubber to form a watertight seal for the tubing in the bight of the blade. It is preferable to prime the slot with a silicone primer, such as are commercially available on the market.

In the form illustrated in FIG. 3, a covered lead wire 70 is secured to the wires 62 and 64 by means of a sealed connector 72 at the one end of the wiper blade, and the opposite ends of the resistance wire are connected to the other covered lead 76 of an electrical circuit. As before, the connections are preferably encased in a heat-shrinkable plastic tube for forming a waterproof connection, and, of course, other types of waterproof connections and coverings may be used. The two lead wires, which have their coverings connected together, are then passed to a connection with the vehicle electric circuit, as explained below. As with the blades 10 of FIG. 1, it is preferable to use polytetrafluoroethylene tubing as a covering for the Nichrome resistance wires.

Figure 5:
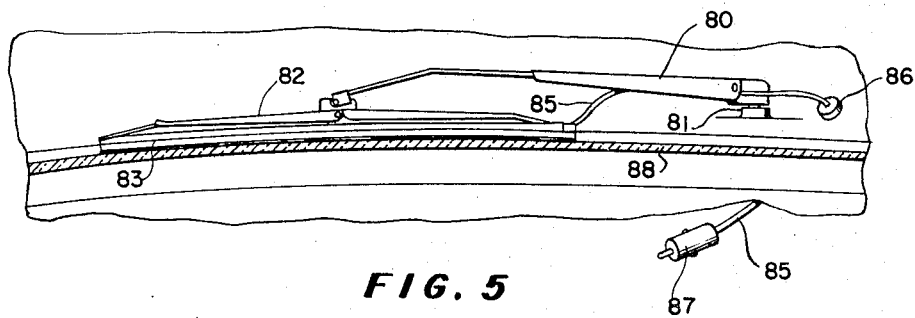
FIG. 5 is a perspective view, partly in section, of a windshield wiper assembly mounted on the windshield of a vehicle according to the present invention.

The blades of the invention are used in windshield wiper assemblies, such as shown in FIG. 5, wherein a conventional wiper arm 80 is mounted on a wiper arm shaft 81 extending through the cowling of the vehicle. The blade is attached to a wiper blade harness or yoke, as shown in general by numeral 83. The blade is attached to the harness by conventional means and the harness is attached by conventional means to the end of the wiper arm 80. In the case of a blade, such as blade 10 with its lead wires 30 and 34, the connected leads, shown generally by numeral 85, are secured to arm 80 and pass through the cowling through a grommet 86. In one form the lead wires are attached to a male plug 87 which may be inserted in a cigarette lighter socket on the dashboard. In another embodiment, the hot lead of the wiper assembly may be connected to the ignition switch, through an on-off switch and a rheostat for controlling the current in the blade, and the other lead may be grounded, as is conventional. A simple rheostat may be used on the hot line for the controlling of the current. The blade rests on windshield 88 and is moved thereacross by means of the arm which is controlled by a motor (not shown) through the shaft 81.

While the invention has been illustrated to particular embodiments, there is no intent to limit the spirit or scope to the precise details so set forth except as defined in the following claims.

I claim:
1. A vehicle windshield wiper blade comprising
  (1) an elongated, flexible, resilient rubber member having a longitudinally extending web depending therefrom with a windshield contacting edge thereon, and means for attaching the same to wiper assembly;
  (2) a small diameter, heat resistant, flexible tubing embedded in said rubber member on both sides of a central vertical plane through said member spaced from said contacting edge;
  (3) a plurality of small diameter resistance wires heat elements passing through said tubes, and each wire being of a substantially smaller diameter than that required for the necessary resistance at the available current, whereby to maintain the inherent flexibility of said rubber member;
  (4) wire means for providing an electric current to said wires; and
  (5) means for connecting said wire means to the electric circuit of said vehicle.

2. A vehicle windshield wiper blade according to claim 1 wherein said flexible tubing and resistance wire is continuous extending through one side of said member, reversed at one end of the blade and extending back through the other side, and said wire means are connected to the two ends of said resistance wires.

3. A vehicle windshield wiper blade according to claim 1 wherein one flexible tubing with contained resistance wires extends through one side of said member and a second flexible tubing with contained resistance wires extends through the other side of said member; and said wire means being connected to both ends of said resistance wires completing the electric circuit therein.

4. A vehicle windshield wiper blade according to claim 1 wherein said flexible tubing is a polytetrafluoroethylene.

5. A vehicle windshield wiper blade according to claim 1 wherein said rubber member is initially formed with opposed grooves extending longitudinally along each side thereof, said tubing being depressed in said grooves, and a sealant adhering to said rubber member embeds said tubing in said member.

6. A vehicle windshield wiper blade according to claim 1 wherein said member has two passages extending longitudinally therethrough spaced on either side of a vertical plane therethrough, said flexible tubing and contained resistance wires being telescoped in said passages.

7. A vehicle windshield wiper blade according to claim 1 wherein said tubing is 20–24 gauge Teflon tubing and at least two 30 gauge Nichrome wires are extended through each said tubing.

8. A vehicle windshield wiper blade according to claim 7 wherein a sufficient number of Nichrome wires are extended through the tubing to provide a temperature of about 850° at a current of 1–5 amps.

9. The method of producing electrically heated windshield wiper blades comprising forming a resilient rubber member having a windshield contacting portion and a pair of longitudinal opposed grooves in opposed sides of said member from end to end thereof and spaced from said contacting portion; extending a plurality of small diameter wires through a pair of lengths of elongated flexible tubing; placing one elongated flexible tubing containing said wires in each said groove; and overlaying said tubing with a quantity of rubber adhering sealant to embed said tubing in said member; and connecting said resistance wires to an electric circuit.

10. The method of claim 9 wherein initially priming said grooves with a silicone primer, inserting the tubing in the primed grooves and placing a silicone rubber material in the grooves in sufficient quantity to embed the tubing in the rubber and substantially fill the grooves.

References Cited
UNITED STATES PATENTS

| | | | |
|---|---|---|---|
| 1,980,254 | 11/1934 | Cartwright | 15—250.06 |
| 2,194,671 | 3/1940 | Pauro | 15—250.06 |
| 2,686,247 | 8/1954 | Curless | 15—250.06 |
| 3,147,505 | 9/1964 | Capasso | 15—250.06 XR |
| 3,201,818 | 8/1965 | Linker | 15—250.06 |
| 3,249,959 | 5/1966 | Theckston | 15—250.06 |
| 3,372,421 | 3/1968 | Meltzer | 15—250.06 |

WALTER A. SCHEEL, *Primary Examiner.*

R. I. SMITH, *Assistant Examiner.*